(12) United States Patent
Almadidy et al.

(10) Patent No.: US 8,202,424 B2
(45) Date of Patent: Jun. 19, 2012

(54) MICROBIAL DEGRADATION OF WATER-BORNE PAINT CONTAINING HIGH LEVELS OF ORGANIC SOLVENT

(75) Inventors: Amer Almadidy, Fort Mill, SC (US); Natacha Lavayssierre, Essert (FR)

(73) Assignee: Atotech Deutschland GmbH, Berlin (DE)

( * ) Notice: Subject to any disclaimer, the term of this patent is extended or adjusted under 35 U.S.C. 154(b) by 351 days.

(21) Appl. No.: 12/524,186

(22) PCT Filed: Jan. 29, 2008

(86) PCT No.: PCT/US2008/052242
§ 371 (c)(1),
(2), (4) Date: Dec. 2, 2009

(87) PCT Pub. No.: WO2008/094872
PCT Pub. Date: Aug. 7, 2008

(65) Prior Publication Data
US 2010/0065493 A1    Mar. 18, 2010

Related U.S. Application Data

(60) Provisional application No. 60/887,070, filed on Jan. 29, 2007.

(51) Int. Cl.
*C02F 3/00* (2006.01)
(52) U.S. Cl. .................................................. 210/611
(58) Field of Classification Search ........... 210/610–611
See application file for complete search history.

(56) References Cited

U.S. PATENT DOCUMENTS

| | | | |
|---|---|---|---|
| 4,391,887 A | 7/1983 | Baumgarten et al. | 435/42 |
| 4,472,181 A | 9/1984 | Herrlander | 55/228 |
| 4,600,513 A | 7/1986 | Mizutani et al. | 210/712 |
| 4,853,334 A * | 8/1989 | Vandenbergh et al. | 435/262 |

(Continued)

FOREIGN PATENT DOCUMENTS

DE    41 36 445    11/1991

(Continued)

OTHER PUBLICATIONS

Sutherland; "Detoxification of polycyclic aromatic hydrocarbons by fungi"; *J. Ind. Microbiol.*, Jan. 1992; 9(1); pp. 53-61. Abstract only.

(Continued)

*Primary Examiner* — Chester Barry
(74) *Attorney, Agent, or Firm* — Renner, Otto, Boisselle & Sklar, LLP

(57) ABSTRACT

A method for degrading, detackifying and reducing solvent in water comprising organic solvent-laden water-borne paint that comprises adding to the water an effective degrading, detackifying and/or solvent-reducing amount of at least one microorganism culture and sufficient micronutrients to sustain the growth of the at least one microorgansim culture and to reduce solvent content of the water. A method of reducing chemical oxygen demand in water comprising organic solvent-laden water-borne paint, wherein the water contains an excess amount of organic solvent from one or both of paint spray operations and paint spray nozzle cleaning operations, the method comprising adding to the water an effective degrading and detackifying amount of at least one microorganism culture and micronutrients to sustain the growth of the at least one microorgansim culture, whereby chemical oxygen demand in the water is reduced by at least 50% relative to the same system without adding the micronutrients.

18 Claims, 3 Drawing Sheets

U.S. PATENT DOCUMENTS

| | | | |
|---|---|---|---|
| 4,980,030 A | 12/1990 | Johnson et al. | 203/4 |
| 4,992,199 A | 2/1991 | Meyer et al. | 252/180 |
| 5,091,089 A | 2/1992 | Shen et al. | 210/611 |
| 5,116,514 A | 5/1992 | Bhattacharyya | 210/712 |
| 5,147,557 A | 9/1992 | Purnell | 210/712 |
| 5,147,558 A | 9/1992 | Purnell | 210/712 |
| 5,205,935 A | 4/1993 | Ruocco | 210/603 |
| 5,215,668 A | 6/1993 | Bhattacharyya | 210/712 |
| 5,248,440 A | 9/1993 | Mitchell et al. | 210/712 |
| 5,259,976 A | 11/1993 | Bui et al. | 210/712 |
| 5,294,352 A | 3/1994 | Waldmann | 210/725 |
| 5,298,186 A | 3/1994 | Mitchell et al. | 252/180 |
| 5,427,944 A | 6/1995 | Lee et al. | 435/262.5 |
| 5,614,103 A | 3/1997 | Agree et al. | 210/725 |
| 5,641,361 A | 6/1997 | Walsh et al. | 134/38 |
| 5,681,470 A | 10/1997 | Safi | 210/603 |
| 5,733,454 A * | 3/1998 | Cummings | 210/603 |
| 6,063,280 A * | 5/2000 | Boyle et al. | 210/610 |
| 6,168,712 B1 | 1/2001 | Kubo et al. | 210/151 |
| 6,325,936 B1 * | 12/2001 | Niijima | 210/626 |
| 6,485,656 B1 | 11/2002 | Meyer et al. | 252/287.17 |
| 6,627,086 B2 | 9/2003 | Mahoney et al. | 210/725 |
| 6,673,263 B2 | 1/2004 | Albu et al. | 252/181 |
| 7,022,194 B2 | 4/2006 | Ennis | 134/38 |
| 2003/0026906 A1 | 2/2003 | Albu et al. | 427/337 |
| 2003/0091814 A1* | 5/2003 | Benz et al. | 428/328 |
| 2004/0000329 A1 | 1/2004 | Albu et al. | 134/38 |
| 2004/0245181 A1 | 12/2004 | Foster | 210/728 |
| 2005/0067347 A1 | 3/2005 | Vanhulle et al. | 210/606 |
| 2006/0122086 A1 | 6/2006 | Albu et al. | 510/201 |
| 2008/0185337 A1 | 8/2008 | Almadidy et al. | 210/611 |

FOREIGN PATENT DOCUMENTS

| | | |
|---|---|---|
| EP | 0 567 102 | 10/1993 |
| EP | 1 238 718 A1 | 9/2002 |
| FR | 2 328 501 | 10/1976 |
| FR | 2 770 227 | 10/1997 |
| FR | 2 864 067 | 6/2005 |
| GB | 1 509 042 | 3/1975 |
| JP | 2000140872 | 5/2000 |
| JP | 2001-340885 | 12/2001 |
| JP | 2003-251387 | 9/2003 |
| WO | 2006/060718 | 6/2006 |

OTHER PUBLICATIONS

Dittmann et al.; "Biodegradation of aromatic compounds by white rot and ectomycorrhizal fungal species and the accumulation of chlorinated benzoic acid in ectomycorrhizal pine seedlings"; *Chemosphere 49*, 2002, pp. 297-306.

Andrade et al.; "A factorial design analysis of chitin production by *Cunninghamella elegans*"; *Canadian Journal of Microbiology*; Nov. 2000; 46, 11; pp. 1042-1045.

Broda et al.; "Lignocellulose degradation by Phanerochaete chrysosporium: gene families and gene expression for a complex process"; *Molecular Microbiology*; 1996; 19(5); pp. 923-932.

Cha et al.; "Biotransformation of Malachite Green by the Fungus *Cunninghamella elegans*"; *Applied and Environmental Microbiology*, Sep. 2001; pp. 4358-4360.

Lisowska et al.; "Concurrent corticosteroid and phenanthrene transformation by filamentous fungus *Cunninghamella elegans*"; *The Journal of Steroid Biochemistry & Molecular Biology*; 85; 2003; pp. 63-69.

Pointing; "Feasibility of bioremediation by white-rot fungi"; *Appl. Microbiol. Biotechnol.*; 2001; 57:20-33.

Pothuluri et al.; "Fungal Biotransformation of 6-Nitrochrysene"; *Applied and Environmental Microbiology*; Aug. 1998; pp. 3106-3109.

Sigoillot et al.; "Energy saving with fungal enzymatic treatment of industrial poplar alkaline peroxide pulps"; *Enzyme and Microbial Technology*; 29; 2001; pp. 160-165.

Zhang et al.; "Phase I and phase II enzymes produced by *Cunninghamella elegans* for the metabolism of xenobiotics"; *FEMS Microbiology Letters*; 138; 1996; pp. 221-226.

* cited by examiner

Before: COD = 5325 ppm  After: COD = 3355 ppm

MICROBIAL DEGRADATION OF WATER-BORNE PAINT CONTAINING HIGH LEVELS OF ORGANIC SOLVENT

The present application is a U.S. national stage application under 35 U.S.C. 371, which is based upon and claims benefit of International Application No. PCT/US2008/052242, filed 29 Jan. 2008, which in turn claims priority to U.S. Application No. 60/887,070, filed 29 Jan. 2007, the entirety of both of which are hereby incorporated herein by reference.

TECHNICAL FIELD

This invention relates to a method for the degradation of water-borne paint containing high levels of organic solvent. More particularly, the invention relates to a novel biological method for the degradation of water-borne paint, its application for paint detackification, and reduction of chemical oxygen demand, in which the water-borne paint contains high levels of organic solvent.

BACKGROUND OF THE INVENTION

The detackification of sticky materials in aqueous systems is a common problem in many industrial operations. Particularly in the automobile industry, the products are coated or painted in enclosed areas referred to as paint spray booths. A significant portion of the paint is oversprayed, that is, not transferred to the object being coated. Such waste paint is generally referred to as oversprayed paint, and is usually collected in water for subsequent waste treatment.

Paint is a tacky material and its tends to coagulate and adhere to the spray booth surfaces and must continuously be removed from the booth to avoid blockage of the recirculating water system. The agglomeration and accumulation of oversprayed paint in the water supply of the recirculating systems results in serious problems such as blockage of the pipes and pumps that circulate the water, and a build-up of paint on the walls of the booth. As more paint is sprayed in the booth, the oversprayed paint removed from the air builds up in the water in the form of a tar-like sludge that can plug the pumps and lines of the paint spray booth recirculating water system. Furthermore, this sludge is extremely difficult to remove from the pump, lines, reservoir, and other internal surfaces of the system. The accumulation of the oversprayed paint in the bottom of the water reservoir also creates a serious problem when the system is periodically cleaned out, with much effort being required to remove the heavy build-up of the oversprayed paint on the bottom of the reservoir.

In order to maintain efficient operation of paint spray booths, detackifying agents are commonly employed in the recirculating water system. Detackifying the paint eliminates or minimizes the tacky properties of the paint, thus preventing the oversprayed paint from adhering to the walls of the spray booth. For instance, to remove water-borne paint from the recirculating water, coagulating agents are added to destabilize the paint solution by reducing negative charge of the particle. The process of destabilizing such solutions is termed coagulation. Flocculation follows in this treatment process, where the destabilized particles are induced to come together, make contact and form large agglomerates.

Detackification also involves the adsorption of the material added to a paint particle, which is similar to a coagulant. However, not all detackifiers are recognized as coagulants. For example, inorganic clays are detackifiers but they do not perform as coagulants. This is because they do not have an overall cationic charge and therefore do not agglomerate particles, which generally have a negative charge. In addition, not all coagulants are effective detackifiers, since a detackifier after adsorption of the paint particle must also make the paint non-sticky.

Various inorganic compounds have been used as flocculating and coagulating agents in paint spray booth water treatment systems. For example, aluminum sulfate has been used widely as a coagulant in paint spray booth water. However, the use of inorganic agents has disadvantages such as high volumes of residual waste sludge. Moreover, inorganic agents are not effective for detackifying solvent paints. Therefore, it is very important to treat the water in the booth in such a way as to make the oversprayed paint material non-sticky so that it will readily separate itself from the water, not adhere to the walls, pipes, pumps and other internals of the spray booth system. It is also desirable to flocculate the paint particles to form a detackified floating sludge. And, it is also desirable to reduce residual harmful solvent.

Oversprayed paint contains various organic compounds, some of which are also hazardous, such as naphthalene and toluene, and these materials as well as the paint pigments, vehicle and resins require treatment. A convenient and officially accepted method to determine the organic content of wastewater and to estimate the efficacy of a process to reduce the amount of organic compounds is to measure the chemical oxygen demand using a method such as ISO 6060:1989 or similar. Chemical oxygen demand (COD) is based upon the fact that nearly all organic compound may be fully oxidized to carbon dioxide by use of a strong oxidizing agent such as chromic acid under highly acidic conditions. COD has long been used for such analyses and is a highly reliable method. COD is reported in milligrams per liter of oxygen required for oxidation of the organic materials in a given sample. The greater the demand, the greater the amount of organic material in the sample.

Other problems may also develop in spray booth systems. For example, the tacky paint deposits are excellent food sources for inadvertently introduced microorganisms such as bacteria and fungus. Often these inadvertently introduced microorganisms can cause odor problems and spot corrosion in the system.

The ultimate waste from the painting process in automobile manufacturing is in the form of sludge. As the sludge may contain hazardous chemicals such as naphthalene and toluene, sludge may be considered a toxic waste. Therefore, disposal of the sludge may present another problem to the industry. Not only does the disposal require more investment, but also the sludge to be disposed of must meet the stringent environmental regulations of government. Therefore, it is additionally desirable to remove solvent during detackification.

Since both the quality and quantity of the sludge determine the final disposal cost, it is desirable to remove hazardous chemicals and other biodegradable solids form the sludge as much as possible in order to reduce the disposal cost of the paint sludge. Thus a sludge devoid of hazardous chemicals can be considered a regular waste and, disposal cost would then be reduced, while a smaller volume of sludge produced would translate into reduced disposal cost.

In recent years, the need to reduce solvent emission has resulted in the reduction of solvent-based or solvent-borne paints, and an increase in the use of water-based or waterborne paints. Because the hydrophilic properties of the water-borne coating compositions render such compositions readily dispersible or soluble in water, removal of paint solids comprised of components such as organic resins, pigments, and organic solvents, from waterborne paint overspray typically requires the use of different detackifying processes in paint spray booths when compared to solvent-based paints. While solvent-based or solvent-borne paint use has been decreasing, it is still used in some markets and locales, although in most places environmental regulations require removal of the solvents in an environmentally acceptable way.

Although microorganisms have been used in spray booth paint detackification systems for some times, in some cases the COD reduction has been found to be inadequate or less than that desired. One reason for this problem is that in some spray booth operations, much more organic solvent is used and therefore much more organic solvent is trapped by the water in the spray booth overspray collection system. In some cases, the excess quantity of organics, including the additional solvent, has overwhelmed the capabilities of even the best microorganism-based paint detackification systems. This problem has been observed in paint operations which utilize several paint colors through a single nozzle or system of nozzles and in changing paint colors additional solvent is circulated through the nozzles to remove prior paint color. In such circumstances the microorganisms may be unable to cope with the excess organic load as fast as it is introduced into the water stream, resulting in the necessity to replace part or all of the recirculating water, creating an expensive and difficult disposal problem, since such contaminated water would be considered a hazardous waste.

These problems demonstrate the desirability of an effective novel paint detackification method that can minimize the deposition of sticky, oversprayed paint in the system, make the resulting paint sludge non-sticky and easy to remove, provide good-quality water that can be recirculated in the system, and that can withstand the higher levels of solvent in some paint overspray.

SUMMARY

The present inventors have discovered that, while prior art microorganism based paint detackification processes have been able to carry out the function of paint detackification and COD reduction in the recirculating water, in operations in which significantly higher concentrations of organic solvents are used, the microorganisms have been ineffective in reducing the COD. The present inventors have discovered that, contrary to prior art practices, the nutrients normally present may be insufficient to promote adequate microorganism growth to obtain an acceptable COD reduction. The present inventors have discovered that by providing additional nutrients to the microorganisms in the recirculating water of a paint detackification operation, at a level to attain an adequate nutrient balance, can result in significantly improved reduction in COD. In some embodiments, the COD reduction thus obtained is greater even than in systems in which no excess solvent is present.

In one embodiment, the present invention relates to a method for degrading, detackifying and reducing solvent in water comprising organic solvent-laden water-borne paint that comprises adding to the water an effective degrading, detackifying and/or COD reducing amount of at least one microorganism culture and sufficient micronutrients to sustain the growth of the at least one microorgansim culture and to reduce solvent content of the water.

In one embodiment, the present invention relates to a method of reducing chemical oxygen demand in water comprising organic solvent-laden water-borne paint, wherein the water contains an excess amount of organic solvent from one or both of paint spray operations and paint spray nozzle cleaning operations, the method comprising adding to the water an effective degrading, detackifying and/or COD reducing amount of at least one microorganism culture and micronutrients to sustain the growth of the at least one microorgansim culture, whereby chemical oxygen demand in the water is reduced by at least 50% relative to the same system without adding the micronutrients.

In one embodiment, the microorganism culture added to the water to degrade, detackify and/or reduce the COD of the water comprising organic solvent-laden water-borne paint include *Bacillus subtilis* and *Pseudomonas fluorescens*.

In one embodiment, the microorganism culture added to the water to degrade, detackify and/or reduce the COD of the water comprising organic solvent-laden water-borne paint include a combination of *Panerochaete sordida* or its mutants or derivatives, *Cunninghamella elegans* or its mutants or derivatives, *Bacillus subtilis* or its mutants or derivatives, and *Pseudomonas fluorescens* or its mutants or derivatives.

Although it is known to add nutrients to some systems, in the past it has been considered unnecessary to add nutrients to paint detackification operations, since it was known that sufficient micronutrients were provided by the paint itself. However, paint overspray containing high levels of organic solvents both places a higher organic load on the system and thus effectively makes the system deficient in the amounts of nitrogen and phosphorous that are required for sustained balanced growth and COD reduction. Nitrogen is necessary for amino and nucleic acids and phosphorus is necessary for energy compounds such as adenosine triphosphate (ATP). Lack of nitrogen and phosphorous therefore limits the growth of a culture of microorganisms.

In one embodiment, the invention relates to a method for degrading, detackifying and/or COD reduction of water comprising organic solvent-laden water-borne paint which comprises adding to the water, a degrading, detackifying and/or COD reducing effective amount of at least one microorganism culture and necessary nutrients to balance the nitrogen (N) and phosphorus (P) needed by the microorganism culture to adequately digest the increased load of organic materials resulting from the high solvent contents in the paint spray booth operations.

In one embodiment, the method of the invention comprises adding one or more fungal cultures and/or bacterial cultures to water comprising organic solvent-laden water-borne paint to form a mixture which is then incubated for a period of time of up to about 15 to 20 days with one or more nutrients incorporated into the mixture prior to incubation and then introduced into the overspray solution with additional nutrients to balance the N and P requirements for the sustained growth of the microorganism culture and for its function of reducing COD in the water.

In another embodiment of the invention the microorganism culture comprises adding to the water one or more bacterial culture with additional nutrients to balance the N and P requirements for the sustained growth of the microorganism and for its function of reducing COD in the water.

In another embodiment of the invention the microorganism culture comprises a combination of species of fungi and/or bacteria with additional nutrients to balance the N and P requirements for the sustained growth of the microorganism and for its function of reducing COD in the water.

In each of the foregoing embodiments, it has been found that a remarkable increase in the biodegradation capacity of the system occurs over that for the same systems operated under normal conditions without the nutrients.

DESCRIPTION OF THE INVENTION

Figure 1:
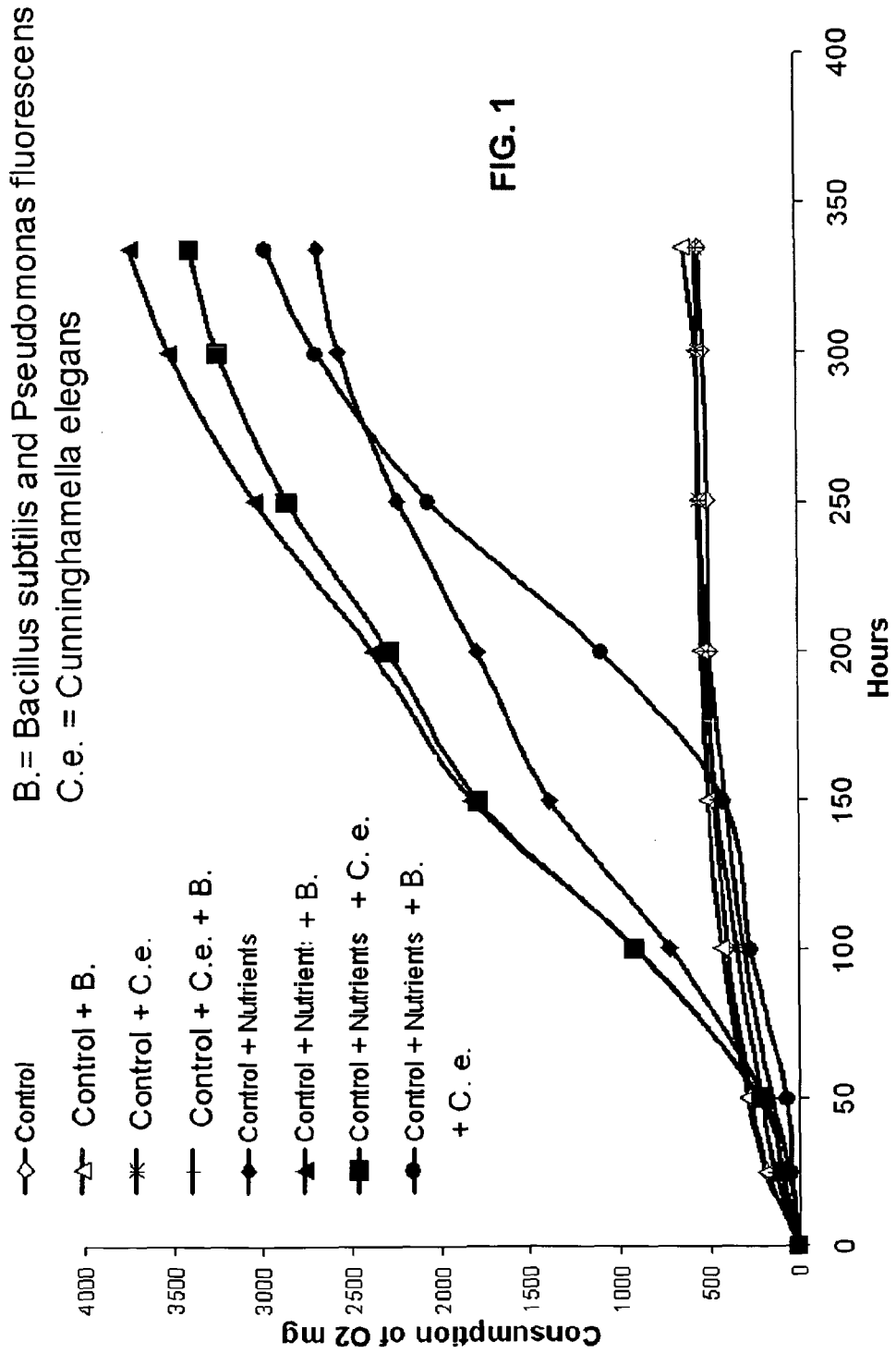
FIG. 1 is a graph illustrating oxygen consumption during a biological treatment of an organic solvent-laden water-borne paint solution with and without addition of microorganisms and with and without addition of nitrogen and phosphorous nutrients to the water.

The present invention for degrading and detackifying organic solvent laden water-borne paint comprises adding to a water-borne paint, a degrading, detackifying and COD reducing effective amount of at least one fungal, bacterial, or combination of fungal and bacterial culture with additional nutrients to meet the need for additional N and P in compensating for the effect of the additional organic solvent load in the water.

In certain embodiments of the present invention, the added microorganism culture comprises one or more bacterial organism culture, fungal organism culture, yeast organism culture, or a mixture of any two or more of such cultures.

In one embodiment, the added bacterial organisms suitable for use in the present invention include, but are not limited to, gram-positive endospore-forming rods, gram-positive aerobic rods, gram-positive facultatively anaerobic rods, gram-negative facultatively anaerobic rods, gram-negative aerobic rods, or a mixture thereof. In certain embodiments, the added bacterial organism culture comprises *Bacillus* sp., *Citrobarobacter* sp., *Aeromonas* sp., *Shewanella* sp., *Pseudomonas* sp., *Corynebacterium* sp., *Rhodococcus* sp., or a mixture thereof.

In one embodiment, the added bacterial organism comprises *Bacillus subtilis*.

In one embodiment, the added bacterial organism comprises *Pseudomonas fluorescens*.

In one embodiment, the added bacterial organism comprises a combination of both *Bacillus subtilis* and *Pseudomonas fluorescens*.

By referring to the microorganism as "added", means that this species is deliberately added to the paint detackification water system, and does not preclude the possibility or even likelihood that additional species of microorganisms may be present in the water system. By adding the identified species in accordance with the present invention, it is intended that the added species are the predominant species in the water system.

In one embodiment, the added fungal organisms suitable for use in the present invention include, but are not limited to, *Paecilomyces* sp., *Aspergillus* sp., *Geotrichum* sp., *Phanerochaete chrysosporium*, or a mixture thereof.

In one embodiment, the added yeast organisms suitable for use in the present invention include, but are not limited to, *Saccharomyces* sp., *Kluyveromyces* sp., *Pichia* sp., or a mixture thereof.

In one embodiment, the process of the present invention may further comprise use or addition of a coagulant to remove paint overspray in paint spray booths. As described above, paint overspray may contain both paint solids and an organic solvent. The paint solids portion generally includes organic resins and pigments. The use of a coagulant in the water can help to separate and demulsify the paint overspray in the agitated solution.

In one embodiment, the coagulant may be any material and/or mixture of materials effective in precipitating paint solids and organic solvents from solution. Non-limiting examples of suitable coagulants that may be employed in the present invention include: 1) a dialkylaminoalkyl (meth)acrylate polymer; 2) a hexosan polymer; 3) a montmorillonite-containing clay; 4) chitosan; 5) a poly[oxyalkylene(dialkylimino)alkylene] polymer solution; 6) a epihalohydrin/dialkylamine polymer; 7) a polydiallydialkylammonium halide polymer; 8) a polyepiamine; 9) an electrolyte/dialkylamine epihalohydrin; and 10) a halide/dialkylamine-epihalohydrin-alkylenediamine polymer; or a mixture of any two or more thereof.

In one embodiment, the process of the present invention may further include the us of a complex metal salt, with or without the foregoing coagulants. The complex metal salt may be any complex metal salt that is capable of coagulating and flocculating paint or of assisting the other components of the system in coagulating or flocculating paint. In one embodiment, the complex metal salt comprises an aluminum salt. Non-limiting examples of useful complex metal salts include aluminum chlorohydrate, aluminum sulfate (alum), zinc chloride, ferric chloride, calcium chloride, magnesium hydroxide, or a mixture of any two or more thereof.

Additional information relating to the use of both coagulants and complex metal salts may be found in U.S. Application Publication No. US2006/0122086, which may be referred to as a reference source for its teachings relating to paint detackification.

The water-borne paints which can be treated in accordance with the method of the present invention may comprise, in one embodiment, water and from about 0.1 to about 10% or even up to about 20% (w/w) of the paint. In other embodiments, the water-borne paints treated in accordance with the method of the present invention may contain from about 0.5% or from about 1% up to about 5% or even up to about 10% (w/w) of the paint. It is to be understood that here and elsewhere in the specification and claims, the range and ratio limits may be combined.

In one embodiment, the water-borne paints which can be treated in accordance with the method of the present invention are water-borne paint solutions which are formed in and recovered from industrial spray paint applications. In one embodiment, such paint solutions may contain from about 0.5 to about 2% (w/w) of the paint.

The method of the present invention can be utilized for the degradation of any water-borne paint solution. That is, a wide variety of paints can be degraded by the method of the present invention. Among the paint compositions that can be treated in accordance with the method of the present invention includes paints which comprise one or more of the following resins: alkyd resins, alkyd/melamine resins, polyester resins, urethane resins, acrylic resins, melamine resins, etc.

The added fungal cultures which may be utilized in the method of the invention include a wide variety of known fungal cultures. In one embodiment, the amount of fungal culture added to the water-borne paint may range from about 0.01 to about 10% or even 15% (v/v) based on the volume of the water-borne paint. In other embodiments, amounts of fungal culture are from about 0.1 or 0.5% up to about 2% or even 5% by volume based on the volume of the water-borne paint can be utilized. One class of fungal cultures which can be utilized in the method of the present invention include the fungal cultures known as white rot fungi. In another embodiment, examples of white rot fungi which can be utilized include the genus *Phanerochaete*, and the genus *Trametis*.

Specific examples of white rot fungal cultures which can be utilized in the method of the present invention include *Phanerochaete chrysosporium* or its mutants or derivatives,

*Trametis versicolor, Heterobasidion annosum* or its mutants or derivatives; *Panerochaete sordida* or its mutants or derivatives.

The added fungal cultures utilized in the method of the invention also may comprise one or more filamentous fungi. Examples of useful filamentous fungi include the genus *Cunninghamella*. Examples of fungal cultures comprising the above genus include *Cunninghamella elegans* or its mutants or derivatives including *Cunninghamella elegans* its mutants or derivatives.

In another embodiment, the added fungal cultures which are useful in the method of the present invention may comprise the genus *Penicillium*, and an example of such genus is *Penicillium* sp. G-1 or its mutants or derivatives.

In another embodiment, a bacterial culture may be used. Examples of bacterial cultures include those from the gram positive genus *Bacillus* and those from the vegetative gram negative genus *Pseudomonas*, particularly *Bacillus subtilis* and *Pseudomonas fluoroescens*. Other examples of gram positive bacterial cultures are the genus' *Brevibacillus, Paenibicillus, Rodococcus, Sprosarcina,* and *Streptomyces* and the species *Bacillus thuringiensis* and *Bacillus licheniformis*. Other examples of vegetative gram negative bacteria include the genuses *Acinobacter, Comamonas, Enerobacter, Marinobacter, Nitrobacter, Nitrosomonas, Paracoccus, Pseudomonas, Sphingomonas, Starkeya,* and *Thiobacillus*.

In accordance with the present invention, any of the foregoing microorganisms can be used, and in accordance with the invention, in the process, additional nutrients, and in particular, nitrogen and phosphorus, are added to the recirculating water. The nutrients may be referred to as micronutrients or micronutrient solutions. The micronutrient solutions generally comprise sources of nitrogen and phosphorous, and generally these sources include salts of nitrogen and phosphorus compounds. While nitrogen and phosphorous are the most likely nutrients to be lacking in an organic solvent-laden overspray paint system treated using biological methods, other nutrients may also be needed depending upon the situation.

In one embodiment, the micronutrients added includes a metal, for example, one or more of aluminum, barium, calcium, chromium, manganese, iron, molybdenum, copper, potassium, sodium or zinc.

In one embodiment, the micronutrients added includes one or more vitamin. Suitable vitamins include, for example, one or more of thiamine, riboflavin, niacin, pantothenic acid, biotin, pyridoxine hydrochloride, folic acid and vitamin $B_{12}$.

In one embodiment, the micronutrients added includes one or more amino acid. Suitable amino acids include any one of the 20 most common amino acids, for example, one or more of alanine, arginine, aspartic acid, glutamic acid, glycine, histidine, isoleucine, cystine, leucine, lysine, methionine, phenylalanine, proline, threonine, serine tryptophan, tyrosine and valine. The amino acids may be added in the form of individual amino acids or as proteins. In addition, in one embodiment, a suitable synthetic amino acid may also be added.

Thus, "micronutrient" is a term that encompasses not only nitrogen and phosphorous, but may include other helpful or necessary additives for sustained growth and improved COD reduction by microorganisms in the presence of organic solvent laden water-borne paint, in accordance with the present invention.

In one embodiment the source of nitrogen may be organic or inorganic. In one embodiment, the source of nitrogen may be one or more of urea, soybean powder, peptone, yeast paste, yeast syrup, peanut cake powder, yeast powder, wheat bran, casein, calcium caseinate, and defatted beancake powder, one or more amino acid, ammonium chloride, ammonium hydroxide, ammonium nitrate, ammonium sulfate, ammonium phosphate, or any other compound of nitrogen that may be useful as a micronutrient with any of the herein disclosed microorganisms.

In one embodiment, the source of phosphorous may be one or more of ATP, ADP, AMP or the like, phosphoric acid, monosodium or monopotassium dihydrogen phosphate, disodium or dipotassium hydrogen phosphate, trisodium or tripotassium phosphate, salts of any other alkali metal or alkali earth metal and phosphoric acid. While phosphates are generally available and most easily incorporated by microorganisms, other sources of P may also be used.

In one embodiment, the micronutrient comprises both nitrogen and phosphorus, e.g., in the form of ammonium phosphate (including any one or a mixture of two or more of mono-, di- and tri-ammonium phosphates), which has the benefit of providing both nitrogen and phosphorus in a single compound. Other known sources of nitrogen and other phosphorus may be used.

In one embodiment, the water comprising organic solvent-laden water-borne paint contains from about 0.1 to about 20% (v/v) of the organic solvent. In another embodiment, the water contains from about 1 to about 10% (v/v) of the solvent.

In one embodiment, the organic solvent comprises one or more in any combination of an alcohol, an aromatic solvent, a hydrocarbon solvent, a ketone, an aldehyde, an ester, an amide, a sulfone, a sulfoxide, a glycol, a glyme, an ether, an organic acid, an amide, a nitrile or any other material known for use as a solvent in paints. The solvent may include, for example, tetrahydrofuran, dimethylformamide, dimethylsulfoxide, acetonitrile.

In one embodiment, the organic solvent comprises one or more of a halohydrocarbon, a glycol ether, a polyol, an ether, an ester of a glycol ether, an ester of a fatty acids or other long chain carboxylic acid, a fatty alcohol or other long-chain alcohol, a short-chain alcohol, a polar aprotic solvent, a siloxane, a hydrofluoroether, a dibasic ester, and aliphatic hydrocarbon solvents or similar solvents or mixtures of such solvents.

In one embodiment, the organic solvent comprises one or more of a hydrocarbon, such as n-Heptane, Isoprene, trans-2-Pentene, 2-Methyl-2-butene, cis-2-Pentene, 2,2-Dimethylbutane, Cyclopentene, 2,3-Dimethylbutane, 2-Methylpentane, 3-Methylpentane, n-Hexene, Hexane, trans-2-Hexene, cis-2-Hexene, Methylcyclopentane, 2,4-Dimethylpentane, Cyclohexene, 2-Methylhexane, 2,3-Dimethylpentane, 3-Methylhexane, 2,2,4-Trimethylpentane, n-Heptane, Methycyclohexane, 2,3,4-Trimethylpentane, 2-Methylheptane, 3-Methylheptane, Octane, Cyclohexane, n-Nonane, α-Pinene, β-Pinene, n-Decane, Propylene, Benzene, Toluene, Ethylbenzene, i-Propylbenzene, m-Xylene, p-Xylene, Styrene, o-Xylene, n-Propylbenzene, Ethyltoluene, p-Ethyltoluene, o-Ethyltoluene, 1,3,5-Trimethylbenzene, 1,2,4-Trimethylbenzene, 1,2,3-Trimethylbenzene, 1,3-Diethylbenzene, 1,4-Diethylbenzene, 1,2-Diethylbenzene, 1-Methyl-3-propylbenzene, 1-Methyl-2-propylbenzene, 1-Methyl-4-propylbenzene, 1,2,3,5-Tetramethylbenzene, 1,2,3,4-Tetramethylbenzene, 1,2,4,5-Tetramethylbenzene, 2-Ethyl-1,3-dimethylbenzene, 1-Ethyl-2,4-dimethylbenzene, 1-Ethyl-3,5-dimethylbenzene, 2-Ethyl-1,4-dimethylbenzene, 4-Ethyl-1,2-dimethylbenzene and Naphthalene. This is not intended to be a limiting list, but is merely exemplary.

In one embodiment, the organic solvent comprises one or more of an oxygen-containing solvent, such as n-propyl butyrate, n-butyl propionate, n-butyl acetate, 2-butoxy-ethanol, 2-ethyl-hexanal, 1-Butanol, 2-Propenal, Propanal, Butanal, 2-Butanone, 4-Methyl-2-pentanone, Butyl formate, 2-Methyl-hexanol, Ethyl acetate, Isopropyl alcohol, 1,4-Dioxane, Methyl isobutyl ketone, Methyl butyl ketone, Vinyl acetate, Methyl tert butyl ether and Methyl ethyl ketone. This is not intended to be a limiting list, but is merely exemplary.

In one embodiment, the organic solvent comprises one or more of an halogen-containing solvent, such as Freon-12, Chloromethane, Freon-114, Vinyl chloride, Bromomethane, Chloroethane, Freon-11, 1,1-Dichloroethylene, Methylene chloride, Freon-113, 1,1-Dichloroethane, cis-1,2-Dichloroethane, Chloroform, 1,2-Dichloroethane, 1,1,1-Trichloroethane, 1,2-Dibromoethane, Carbon tetrachloride, 1,2-Dichloropropene, Trichloroethylene, cis-1,3-Dichloropropene, micronutrients are added, in the amounts indicated in the table below: nitrogen, in the form of urea, and phosphorous, in the form of phosphoric acid. As shown in the table below, the reduction in COD is greatly improved in these examples, as compared to the examples 3-5 in which no additional micronutrients are added. Thus, the unexpected benefit of a significantly improved reduction in the COD of the water in the system is shown. This effect was not expected because it has previously been considered and taught that addition of such micronutrients was neither needed nor appropriate, since the water, paint, resin and other additives were believed to contain all the nutrients needed by the microorganisms in reducing the load on the wastewater as reflected by the COD measurements.

| Example | 2 | 3 | 4 | 5 | 6 | 7 | 8 | 9 |
|---|---|---|---|---|---|---|---|---|
| Description | Control (C) | C + B. subtilis | C + C. elegans | C + B. subtilis + C. elegans | C + NP | C + NP + B. Subtilis | C + NP + C. Elegans | C + NP + B. subtilis + C. Elegans |
| Overspray with biological treatment (ml) | 480 | 480 | 480 | 480 | 480 | 480 | 480 | 480 |
| Urea (g) (46% of N) | | | | | 10.1 | 10.1 | 10.1 | 10.1 |
| 85% Phosphoric acid (ml) | | | | | 10 | 10 | 10 | 10 |
| B. subtilis culture - ml | | 1 | | 1 | | 1 | | 1 |
| C. Elegans culture (ml) | | | 5 | 5 | | | 5 | 5 |
| DI water for 500 ml | 20 | 15 | 15 | 10 | 10 | 5 | 5 | 0 |
| COD mg $O_2$/l filtered (0.45 μm) | 35250 | 36550 | 36050 | 36050 | 35550 | 36000 | 36050 | 34550 |
| COD filtered mg $O_2$/l (0.45 μm) after 300 h | 31000 | 31050 | 33400 | 33900 | 27700 | 23650 | 19100 | 24400 |
| % COD reduction | 12.06% | 15.05% | 7.35% | 5.96% | 22.08% | 34.31% | 47.02% | 29.38% | trans-1,3-Dichloropropene, 1,1,2-Trichloroethane, Tetrachloroethylene, Chlorobenzene, 1,1,2,2-Tetrachloroethane, 1,3-Dichlorobenzene, 1,4-Dichlorobenzene, 1,2-Dichlorobenzene, 1,2,4-Trichlorobenzene, hexachloro-1,3-Butadiene, Allyl chloride, trans-1,2-dichloroethene, Tetrahydrofuran, Bromodichloromethane, Dibromochloromethane, Bromoform and Benzyl chloride.

EXAMPLES

Cultures of *Cunningham elegans* (*C. elegans*) *Pseudomonas fluorescens* (*P. fluoroescens*) and *Bacillus subtilis* (*B. subtilis*) are prepared.

Example 1

Overspray organic solvent-laden water-borne paint from an automobile factory which uses excessive solvent in their spray operation is treated by addition of the fungi *C. elegans* and monitored over a period of time for chemical oxygen demand (COD) in an attempt to reduce the COD of the water. The COD of the water is not significantly reduced.

Examples 2-9

Overspray organic solvent-laden water-borne paint from Example 1 are treated by a variety of means and the COD determined. Example 2 is substantially the same as Example 1 above, so that the water contains the fungi *C. elegans*. In examples 3-5, the water contains the fungi *C. elegans* to which is added the bacterial species *B. subtilis*, *P. fluorescens* or a mixture of these two bacterial species, as identified in the table below. In examples 6, 7, 8, and 9, in addition to the foregoing microorganisms (both fungal and bacterial), two Referring now to the Figures, FIG. 1 is a graph illustrating oxygen consumption during a biological treatment of a sample of water comprising organic solvent-laden water-borne paint with and without addition of microorganisms and with and without addition of nitrogen and phosphorous nutrients to the water, in Examples 2-9 described above. While the table above indicates the overall reduction in COD for the various samples, FIG. 1 graphically illustrates the dramatic improvement in oxygen uptake achieved by addition of both microorganisms and micronutrients to the organic solvent-laden water-borne paint.

Figure 2:
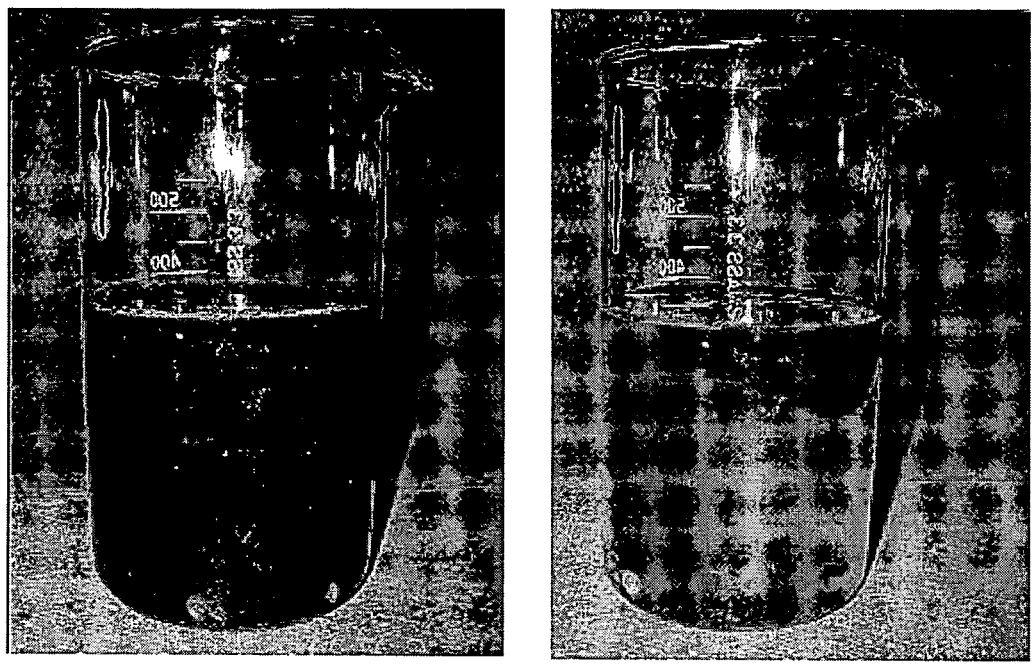
FIG. 2 is a photograph of water-borne paint solution samples before and after biological treatment in accordance with the present invention.

FIG. 2 is a photograph of samples of water comprising organic solvent-laden water-borne paint before and after biological treatment in accordance with the present invention. As shown in FIG. 2, in the "Before" sample, the water has dark paint distributed throughout, and the COD is measured at 5325 ppm. In contrast, in the "After" sample, the water is much more clear and colorless, the remaining dark color is isolated and the COD is only 3355 ppm. As is clearly evident from the photographs, use of the present invention is quite effective in detackifying and degrading the paint in the water, resulting in a clear, colorless water, which also has a reduced COD.

Figure 3:
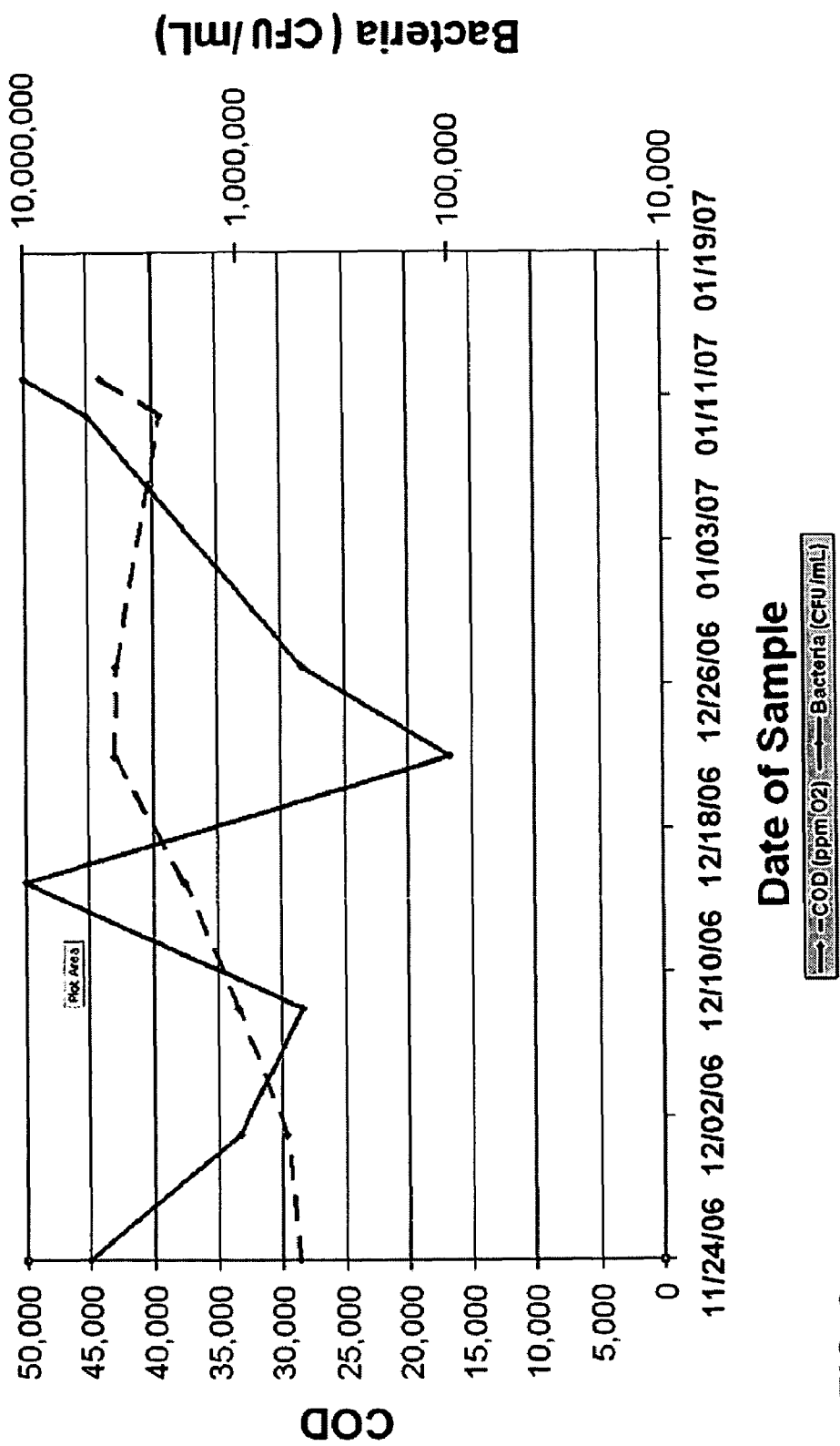
FIG. 3 is a graph illustrating how attempting to remediate COD solely by use of microorganisms is ineffective.

FIG. 3 is a graph illustrating how attempting to remediate COD solely by use of microorganisms is ineffective. In the graph shown in FIG. 3, the dashed line represents the COD, in ppm (or milligrams per liter) $O_2$, of the sample of water comprising organic solvent-laden water-borne paint. The highly varying solid line represents the bacterial count of bacterial cultures added on a day-by-day basis, expressed logarithmically in the number of colony forming units (CFU) per milliliter (ml), shown as "CFU/ml" in FIG. 3. As is apparent from the graph, even quite high bacterial counts do not effectively or significantly reduce the COD of the water. This is a comparative example, to show that, without the addition of nutrients as disclosed herein, the high COD values observed in water comprising organic solvent-laden water-borne paint are not effectively reduced.

The time for incubating the water comprising organic solvent-laden water-borne paint may be suitably determined by those of skill in the art based upon factors such as the total organic loading, the loading of microorganisms, the temperature of the water, and the quantity of micronutrients added in accordance with the present invention. In one embodiment, the mixture is incubated for a period ranging from a few hours to about 20 days, at a temperature in the range from about 10° C. to about 45° C. In one embodiment, the mixture is incubated for a period ranging from about 5 hours up to about 300 hours. In one embodiment, the mixture is incubated at a temperature in the range from about 15° C. to about 35° C. for a period of about 3 to about 15 days. In one embodiment, the mixture is incubated on a continuous, flow-through basis, in which the average residence time is in the foregoing ranges.

While the invention has been explained in relation to its various embodiments, it is to be understood that other modifications thereof will become apparent to those skilled in the art upon reading the specification. Therefore, it is to be understood that the invention disclosed herein is intended to cover such modifications as fall within the scope of the appended claims.

The invention claimed is:

1. A method for degrading, detackifying and reducing solvent in water comprising organic solvent-laden water-borne paint that comprises adding to the water an effective degrading, detackifying and/or COD reducing amount of at least one microorganism culture and sufficient micronutrients to sustain the growth of the at least one microorgansim culture and to reduce solvent content of the water, wherein reduction of chemical oxygen demand in the water is at least 50% greater than the same system without adding the micronutrients,
wherein the at least one microorganism culture comprises a combination of *Panerochaete sordida* or its mutants or derivatives, *Cunninghamella eleqans* or its mutants or derivatives, *Bacillus subtilis* or its mutants or derivatives, and *Pseudomonas fluorescens* or its mutants or derivatives.

2. A method of reducing chemical oxygen demand in water comprising organic solvent-laden water-borne paint, wherein the water contains an excess amount of organic solvent from one or both of paint spray operations and paint spray nozzle cleaning operations, the method comprising adding to the water an effective degrading, detackifying and/or COD reducing amount of at least one microorganism culture and micronutrients to sustain the growth of the at least one microorgansim culture, wherein reduction of chemical oxygen demand in the water is at least 50% greater than the same system without adding the micronutrients,
wherein the at least one microorganism culture comprises a combination of *Panerochaete sordida* or its mutants or derivatives, *Cunninghamella eleqans* or its mutants or derivatives, *Bacillus subtilis* or its mutants or derivatives, and *Pseudomonas fluorescens* or its mutants or derivatives.

3. The method of claim 1 wherein the at least one microorganism culture comprises a fungal culture, a bacterial culture, or a combination of a fungal culture and a bacterial culture.

4. The method of claim 1 wherein from about 0.01 to about 10% (v/v) of the at least one microorganism culture is added to the water.

5. The method of claim 1 wherein from about 0.1 to about 2% (v/v) of the at least one microorganism culture is added to the water.

6. The method of claim 1 wherein from about 0.01 to about 10% (w/v) of the at least one nutrient is added to the water.

7. The method of claim 1 wherein the water comprising organic solvent-laden water-borne paint is derived from the wastewater of an industrial paint booth.

8. The method of claim 1 wherein the micronutrients comprise nitrogen and phosphorus.

9. The method of claim 8 wherein the micronutrients further comprise manganese, iron, molybdenum, copper, zinc or a mixture of any two or more thereof.

10. The method of claim 2 wherein the at least one microorganism culture comprises a fungal culture, a bacterial culture, or a combination of a fungal culture and a bacterial culture.

11. The method of claim 2 wherein from about 0.01 to about 10% (v/v) of the at least one microorganism culture is added to the water.

12. The method of claim 2 wherein from about 0.1 to about 2% (v/v) of the at least one microorganism culture is added to the water.

13. The method of claim 2 wherein from about 0.01 to about 10% (w/v) of the at least one nutrient is added to the water.

14. The method of claim 2 wherein the water comprising organic solvent-laden water-borne paint is derived from the wastewater of an industrial paint booth.

15. The method of claim 2 wherein the micronutrients comprise nitrogen and phosphorus.

16. The method of claim 15 wherein the micronutrients further comprise manganese, iron, molybdenum, copper, zinc or a mixture of any two or more thereof.

17. The method of claim 1, wherein the microorganism comprises *Cunninghamella elegans* or its mutants or derivatives, *Bacillus subtilis* or its mutants or derivatives or a combination thereof and the micronutrients comprise nitrogen and phosphorus.

18. The method of claim 2, wherein the microorganism comprises *Cunninghamella elegans* or its mutants or derivatives, *Bacillus subtilis* or its mutants or derivatives or a combination thereof and the micronutrients comprise nitrogen and phosphorus.

* * * * *

UNITED STATES PATENT AND TRADEMARK OFFICE
CERTIFICATE OF CORRECTION

PATENT NO. : 8,202,424 B2
APPLICATION NO. : 12/524186
DATED : June 19, 2012
INVENTOR(S) : Amer Almadidy et al.

Page 1 of 1

It is certified that error appears in the above-identified patent and that said Letters Patent is hereby corrected as shown below:

Summary, col 4, line 13, "include a combination of *Panerochaete sordida* or its mutants or derivatives," should read --
"include a combination of *Phanerochaete sordida* or its mutants or derivatives,"

Description of the Invention, col 7, line 2, "or derivatives; *Panerochaete sordida* or its mutants or derivatives," should read --
"or derivatives; *Phanerochaete sordida* or its mutants or derivatives,"

Claim 1, col 11, line 38, "a combination of *Panerochaete sordida* or its mutants or derivatives," should read --
"a combination of *Phanerochaete sordida* or its mutants or derivatives,"

Claim 2, col 11, line 54, "a combination of *Panerochaete sordida* or its mutants or derivatives," should read --
"a combination of *Phanerochaete sordida* or its mutants or derivatives,"

Signed and Sealed this
Thirtieth Day of October, 2012

David J. Kappos
*Director of the United States Patent and Trademark Office*